(12) United States Patent
Salman

(10) Patent No.: US 7,779,589 B2
(45) Date of Patent: Aug. 24, 2010

(54) POST ANCHOR/ADAPTER SYSTEM

(76) Inventor: Mark T. Salman, 3502 Meadowbriar Ct., Greensboro, NC (US) 27410

( * ) Notice: Subject to any disclaimer, the term of this patent is extended or adjusted under 35 U.S.C. 154(b) by 1238 days.

(21) Appl. No.: 11/094,529

(22) Filed: Mar. 31, 2005

(65) Prior Publication Data

US 2006/0239764 A1 Oct. 26, 2006

(51) Int. Cl.
 *E02D 27/42* (2006.01)
 *E02D 5/80* (2006.01)
(52) U.S. Cl. .................. 52/298; 52/165; 248/156; 248/530
(58) Field of Classification Search ........... 52/155, 52/165, 170, 709, 704, 154, 153, 298, 835, 52/848; 248/530, 545, 156
See application file for complete search history.

(56) References Cited

U.S. PATENT DOCUMENTS

| | | | | |
|---|---|---|---|---|
| 122,947 A * | 1/1872 | Hopgood | ............... | 52/153 |
| 405,658 A * | 6/1889 | Campany | ............... | 52/170 |
| 429,627 A * | 6/1890 | Howser | ............... | 256/52 |
| 709,300 A | 9/1902 | Buchtel | | |
| 772,928 A * | 10/1904 | Dunlap | ............... | 52/298 |
| 837,820 A * | 12/1906 | Folsom et al. | ............... | 52/168 |
| 844,726 A * | 2/1907 | Hunter | ............... | 111/99 |
| 864,218 A * | 8/1907 | Woodruff | ............... | 256/48 |
| 868,953 A * | 10/1907 | White | ............... | 52/302.5 |
| 1,244,119 A * | 10/1917 | Mulnix et al. | ............... | 52/835 |
| 1,329,026 A * | 1/1920 | Snyder | ............... | 52/170 |
| 1,502,342 A * | 7/1924 | Lucas | ............... | 52/298 |
| 1,665,995 A * | 4/1928 | Wiley | ............... | 52/170 |
| 1,965,639 A * | 7/1934 | Glass | ............... | 248/353 |
| 1,982,569 A * | 11/1934 | Byrd | ............... | 52/298 |
| 2,580,948 A * | 1/1952 | Pancake | ............... | 40/607.08 |
| 2,713,327 A * | 7/1955 | Binkley | ............... | 119/790 |
| 3,159,248 A * | 12/1964 | Biehn | ............... | 52/165 |
| 3,225,501 A * | 12/1965 | Mccaron | ............... | 52/298 |
| 3,324,666 A * | 6/1967 | Lee | ............... | 405/231 |
| 3,487,646 A * | 1/1970 | Gatien | ............... | 405/257 |
| 3,527,355 A * | 9/1970 | Boyer | ............... | 211/85.19 |
| 3,610,288 A * | 10/1971 | Carr | ............... | 138/96 R |
| 3,698,144 A * | 10/1972 | Stratton | ............... | 52/99 |
| 3,851,483 A * | 12/1974 | Holley, Jr. | ............... | 405/232 |

(Continued)

FOREIGN PATENT DOCUMENTS

FR 2614059 A3 * 10/1988

(Continued)

*Primary Examiner*—Robert J Canfield
(74) *Attorney, Agent, or Firm*—Richard C. Litman

(57) ABSTRACT

A post anchor/anchor adapter system is unitary cast or machined steel or the like. An anchor/adaptor alone is driven alone into a hole cut in in-place concrete. The system includes an anchor extension tube for driving into soft soil. The inventive anchor/adaptor has a body in the form of an elongate square tube having radius-curved corners vertically driven into a round receiving hole, forming creases and a secure anchor. The tube has an upper female portion for a post and a lower female portion for an extender and is divided by a horizontal plug wall integral with the tube structure. The lower female portion of the anchor/adapter tapers outward towards its lower open end allowing for an interference fit with the driven tube acting as an anchor. The female portion upper end has crescent-shaped tabs defining a disk sized to plug the drilled hole.

8 Claims, 9 Drawing Sheets

U.S. PATENT DOCUMENTS

| | | | | |
|---|---|---|---|---|
| 3,969,853 | A | * | 7/1976 | Deike .......................... 52/156 |
| 4,033,080 | A | * | 7/1977 | Fukushima ................ 52/223.4 |
| 4,048,776 | A | * | 9/1977 | Sato ............................ 52/297 |
| 4,133,154 | A | * | 1/1979 | Ruzicka ....................... 52/298 |
| 4,240,766 | A | * | 12/1980 | Smith et al. ................... 404/10 |
| 4,269,010 | A | * | 5/1981 | Glass ........................... 52/154 |
| 4,279,104 | A | | 7/1981 | Classen |
| 4,589,500 | A | * | 5/1986 | Moraly ........................ 173/90 |
| 4,644,713 | A | * | 2/1987 | Lehman ....................... 52/165 |
| 4,715,297 | A | * | 12/1987 | Lichter ........................ 109/50 |
| 4,787,601 | A | * | 11/1988 | Rybak .......................... 256/19 |
| 4,845,889 | A | * | 7/1989 | Taylor ........................ 47/32.4 |
| 4,939,037 | A | * | 7/1990 | Freeman et al. ............ 428/36.3 |
| 5,090,656 | A | | 2/1992 | Brown |
| 5,165,663 | A | * | 11/1992 | Wells .......................... 256/19 |
| 5,211,393 | A | * | 5/1993 | Rolffs et al. ................ 473/484 |
| 5,217,194 | A | * | 6/1993 | Brownell .................... 248/156 |
| 5,285,614 | A | * | 2/1994 | Fouad ......................... 52/848 |
| 5,301,481 | A | * | 4/1994 | Novak ......................... 52/165 |
| 5,425,593 | A | * | 6/1995 | Buehler ..................... 403/305 |
| 5,625,988 | A | * | 5/1997 | Killick ........................ 52/298 |
| 5,632,464 | A | * | 5/1997 | Aberle ....................... 248/530 |
| 5,752,349 | A | * | 5/1998 | Fitzsimmons et al. ......... 52/165 |
| 5,782,040 | A | * | 7/1998 | McCartan ...................... 52/98 |
| 5,782,443 | A | * | 7/1998 | La Fontaine ................ 248/156 |
| 5,901,525 | A | * | 5/1999 | Doeringer et al. ............. 52/835 |
| 5,913,778 | A | * | 6/1999 | Hying et al. ................... 52/40 |
| 6,041,559 | A | * | 3/2000 | Schickert et al. .............. 52/165 |
| 6,050,034 | A | * | 4/2000 | Krinner ....................... 52/155 |
| 6,062,771 | A | * | 5/2000 | Roberts ...................... 405/244 |
| 6,098,353 | A | * | 8/2000 | Stanfield ...................... 52/170 |
| 6,098,361 | A | * | 8/2000 | Roten et al. ................... 52/298 |
| 6,113,055 | A | | 9/2000 | Salman |
| 6,260,314 | B1 | * | 7/2001 | Church et al. ................. 52/170 |
| 6,308,926 | B1 | * | 10/2001 | Meyer ........................ 248/530 |
| 6,343,446 | B1 | | 2/2002 | Beard |
| 6,350,093 | B1 | * | 2/2002 | Petersen et al. ............. 411/82.1 |
| 6,390,436 | B2 | * | 5/2002 | Barnes et al. ............... 248/548 |
| 6,457,895 | B1 | | 10/2002 | Salman |
| 6,461,084 | B1 | * | 10/2002 | Stuart ........................ 405/244 |
| 6,772,565 | B1 | * | 8/2004 | Schiltz et al. ................. 52/155 |
| 6,886,296 | B1 | * | 5/2005 | John et al. .................... 52/170 |
| 7,003,919 | B2 | * | 2/2006 | Riker ........................... 52/170 |
| 7,150,579 | B2 | * | 12/2006 | Newton ....................... 404/11 |
| 7,185,461 | B2 | * | 3/2007 | Lapointe et al. ............... 52/154 |
| 7,219,872 | B2 | * | 5/2007 | Walker ....................... 248/516 |
| 7,234,670 | B1 | * | 6/2007 | Gretz et al. ................. 248/156 |
| 7,434,778 | B2 | * | 10/2008 | Leahy et al. ................. 248/548 |
| 7,543,415 | B2 | * | 6/2009 | Svendsen ...................... 52/170 |
| 2002/0040957 | A1 | * | 4/2002 | Carter ........................ 248/530 |
| 2002/0139067 | A1 | * | 10/2002 | Lapointe et al. ............... 52/165 |
| 2006/0104715 | A1 | * | 5/2006 | Newton ......................... 404/9 |
| 2006/0278772 | A1 | * | 12/2006 | Walker ....................... 248/156 |

FOREIGN PATENT DOCUMENTS

| | | | |
|---|---|---|---|
| GB | 2138048 | A | * 10/1984 |
| JP | 04073321 | A | * 3/1992 |

* cited by examiner

POST ANCHOR/ADAPTER SYSTEM

BACKGROUND OF THE INVENTION

1. Field of the Invention

The present invention relates to post anchors. More particularly, the present invention relates to post anchors useful in existing concrete and hard material, as well as softer earth.

2. Description of the Related Art

Traffic sign supports, parking meter poles, fence posts and the like are typically installed in hard earth or cement by driving a post anchor or base into a hole drilled in the hard material and then attaching the support or post to the anchor. Also, post anchors are useful in softer soil to provide a steady base for the post. The driving method in softer soil conditions is relatively quick and can be performed with manual tools such as sledgehammers. Most post anchor designs attempt to ensure durability when subjected to weather and forces such as wind load or impact from a vehicle.

There are many conflicting performance requirements for post anchors. If the anchor is light in weight for ease of driving and to reduce costs it may have insufficient strength to withstand forces applied during installation in difficult or hard ground conditions or from impact from an errant vehicle.

Conversely, some anchors may be sufficiently strong to withstand the installation forces or impact forces, yet they are inherently heavy and therefore are difficult to drive due to increased mass absorbing impact energy. Increased mass also results in higher material and transportation costs.

In practice it has been shown that post anchors, even when installed to the correct depth for a particular application, have varying degrees of force applied over their length. For example, the top of the anchor is subject to impact energy and higher bending forces in use, as opposed to the bottom of the anchor. A common anchor design attempts to address the varying strength requirement by telescoping the next larger size of tubing over the top 6-8 inches of the anchor to form a telescoping system. However, these strengthening pieces do not stay attached to the anchor during driving (installation) or transport. Further, the tolerance between the two coaxial parts can make the anchor sloppy, allowing the post to move laterally after installation in the anchor. Attempts at correcting this problem include welding the two coaxial parts together, adding substantial expense to the installation of the anchor, or bolting them together, which is often ineffective. In either case, in the event the post, anchor, or strengthening sleeve is of the perforated type where the fastener must engage aligned holes, joining the three pieces is difficult.

Based on the geology or ground conditions specific to the location (which can vary dramatically over a very small area) where an anchor for a post is desired, the required installation depth can vary. For example, in extremely hard ground conditions such as dry clay, asphalt, etc., the anchor may be driven to a lesser depth, yet still provide sufficient support to the post. In marsh or damp soil condition, the anchor depth and length required increases.

With both square and round shaped anchoring systems, there is a tendency for the anchor to fill up inside with hard packed material during driving into the ground or soil. This material must somehow be removed in order to insert or telescope the post onto the anchor. Also, the post, particularly a heavy post, may fall too far into the anchor when the post is being installed in the anchor in the event the soil material does not come up into the bottom of the anchor during driving. This factor makes it very difficult for an individual, without assistance, to accomplish a post installation with the post telescoped to the correct depth.

When posts are telescoped within a driven anchor, ground water can promote corrosion of the anchor or post and make it difficult to extract the post for repairs or replacement. Further, the anchor or post can become weakened, and fail unexpectedly under normal use.

In the event a square anchor is installed in a core drilling in existing concrete by driving, an annulus is left between the square anchor shape and the round-drilled hole. Conventional methods require the void space to be filled with a sealer or concrete flashing material for aesthetics, adding to the cost of the installation.

There is a need for a more effective post anchor system which meets the following criteria:

(a) Low weight to reduce transport and material costs and to provide ease of installation;

(b) High strength to ensure durability in use, particularly use where vehicle impacts are anticipated, and to ensure durability of the anchor during installation such as by impact driving;

(c) Sealing against ground water infiltration to the post and to prevent ground materials from entering the portion receiving the post during installation of the anchor;

(d) Flexible in design, allowing for one unit to be used alone in existing concrete and hard earth and in connection with another element for softer earth, the connection being made without expensive welds or unreliable fasteners; and (e) Configured to prevent a post from falling too far into the anchor.

Thus, a modular post anchor adapter solving the aforementioned problems is desired.

SUMMARY OF THE INVENTION

The post anchor/anchor adapter of the present invention is unitary cast or machined steel, ferrous alloy, aluminum or the like. It is useful alone in existing concrete, rock, or hard ground. It is also useful as part of a system where it is employed as an adaptor telescoped over the next smaller size anchor tube driven into softer or marshy soil. In a preferred configuration, the inventive anchor/adaptor of the present invention has a body in the form of an elongate square tube to be vertically driven into a round receiving hole or into the ground.

The tube structure is divided into an upper female portion and a lower female portion by a horizontal plug wall integral with the tube structure, forming an upper receiver for a post and a lower portion open to receive compacted ground materials when used as an anchor. The lower portion may also receive a driven tube of the next smaller size acting as an anchor in softer and swampy ground, the anchor/adaptor acting as an adaptor for the lower anchor. The lower female portion of the anchor/adapter tapers outward towards its lower open end, allowing for an interference fit with the driven tube acting as an anchor. The upper opening end of the upper female portion has four crescent-shaped tabs extending from its four walls which define a disk sized to plug the voids of a hole drilled to receive the square tubular structure for aesthetic reasons and to prevent articles from falling into the voids.

The body tubular structure may be triangular, hexagonal or other polygonal shape, although the square shape is preferred. The female upper and lower portions of the anchor/adaptor may be of any desired configuration so as to receive any desired shape of post and lower anchor. The horizontal plug wall keeps water and earth from entering the upper female portion, providing for a constant length, water-free receiver for posts. The radius-curved corners of the tubular body of the anchor/adaptor are rounded which, when driven into a hole drilled in concrete, rock, or hard ground cuts into the sides of the hole, locking the body in place.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a post anchor/anchor adaptor system for mounting posts in set cement and a variety of earth and surface conditions. The invention is useful alone as an anchor in cement and hard ground conditions including rock, and is useful in softer earth, particularly with an extension tube.

Figure 1:
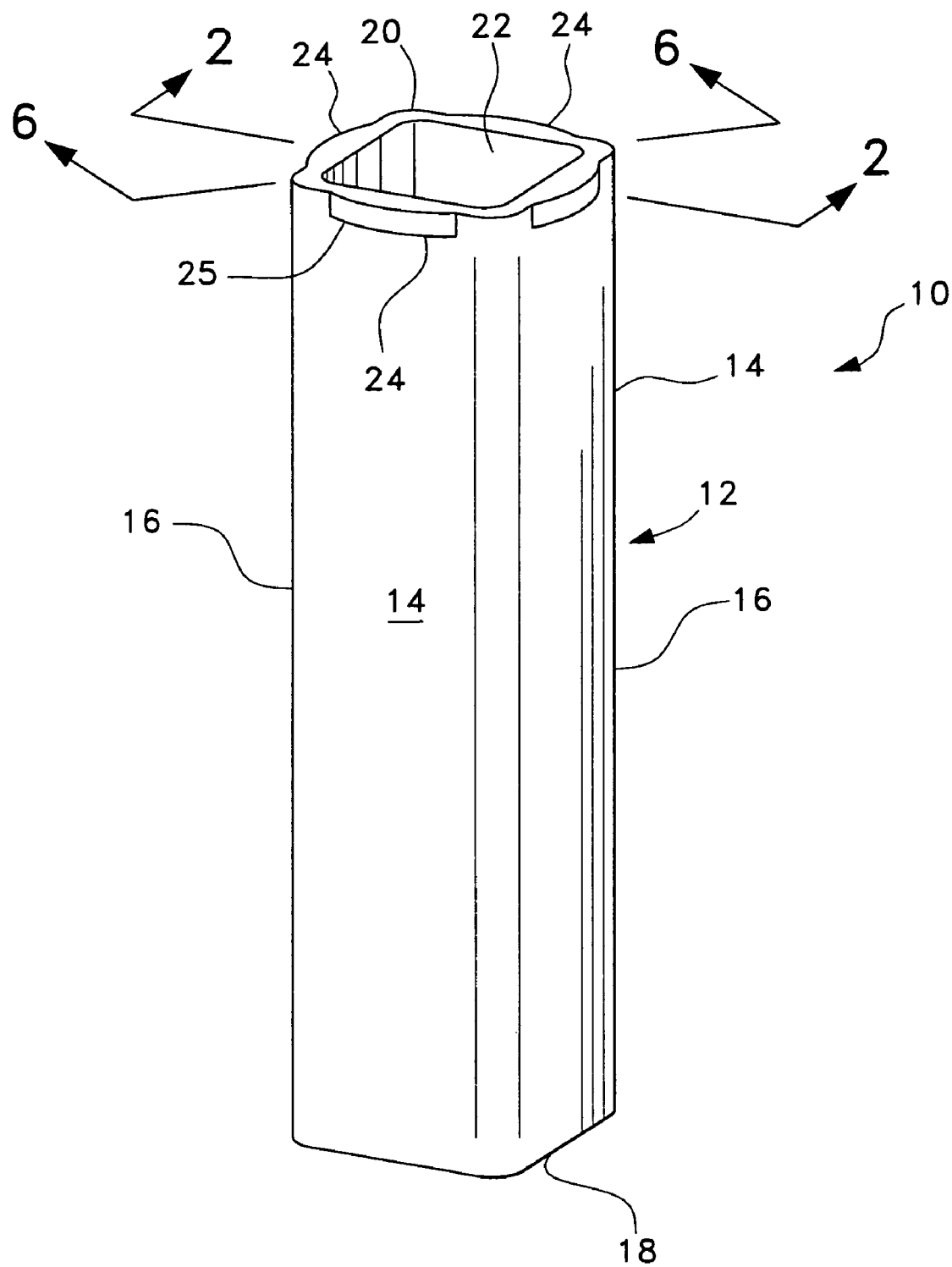
FIG. 1 is a perspective view of a post anchor/adapter according to the present invention.
Figure 2:
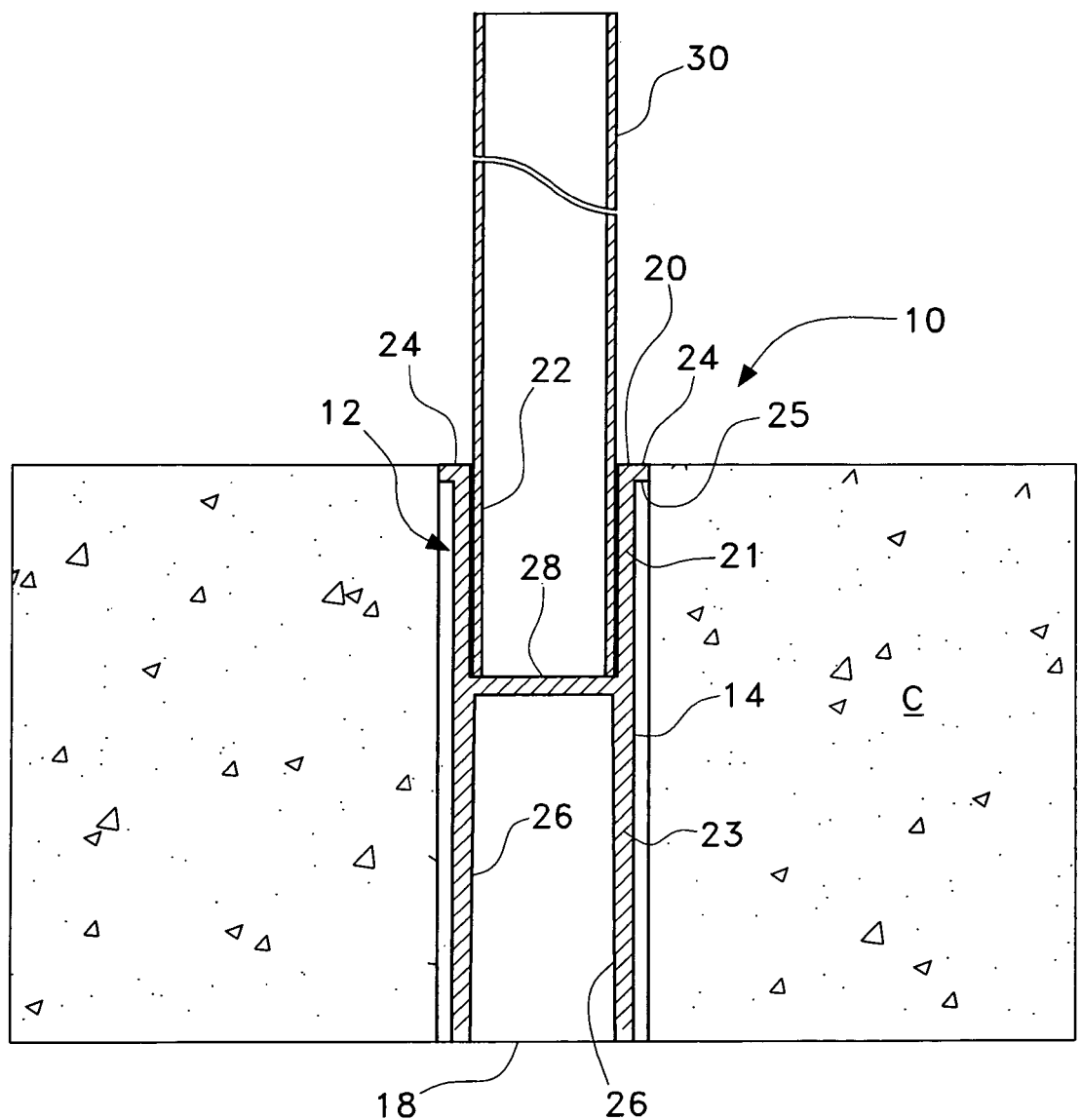
FIG. 2 is an environmental sectional view of the post anchor/adaptor taken along line 2-2 of FIG. 1.
Figure 3:
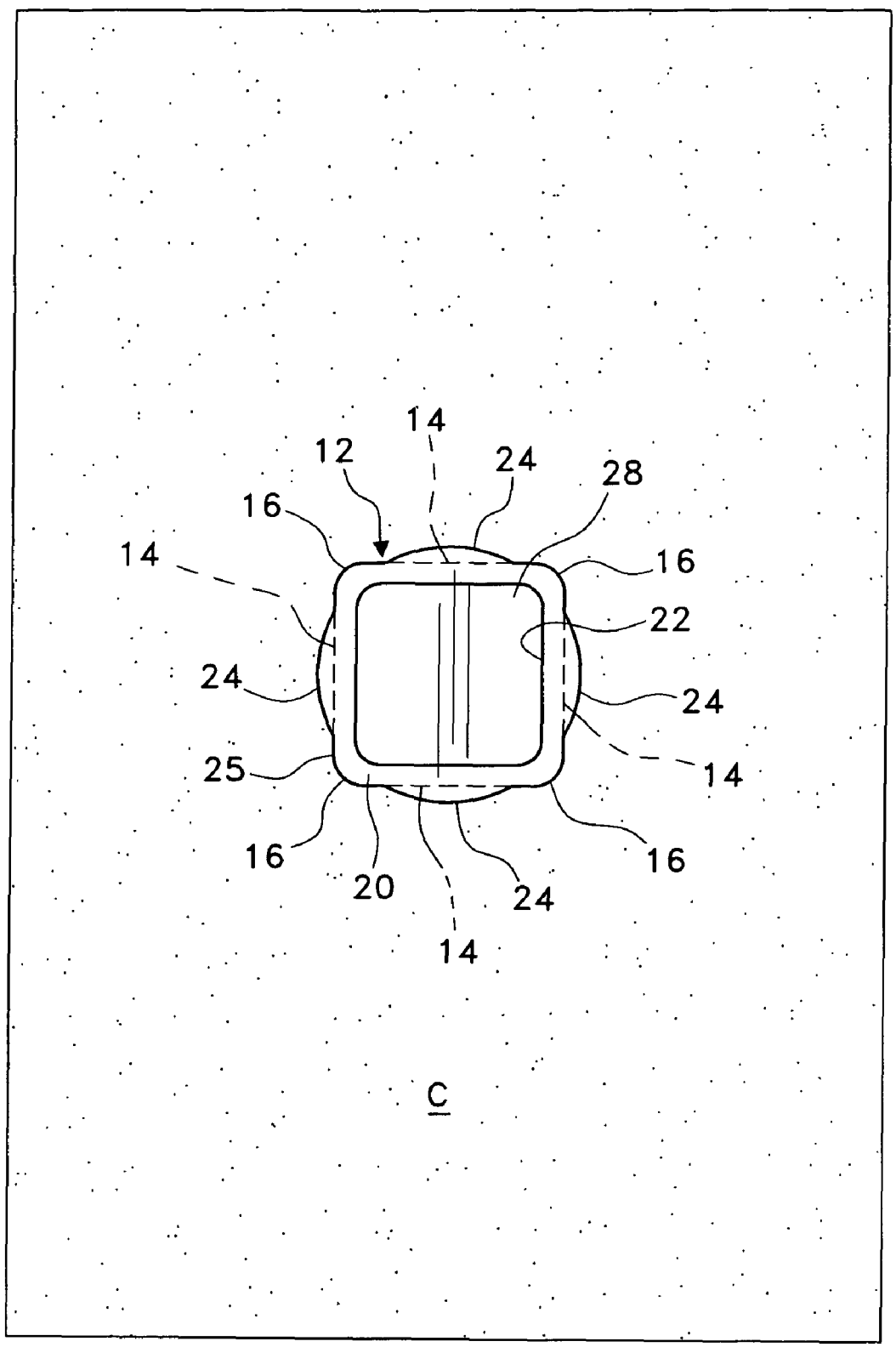
FIG. 3 is an environmental plan view of the anchor/adaptor of FIG. 1 as installed in a concrete pad.
Figure 4:
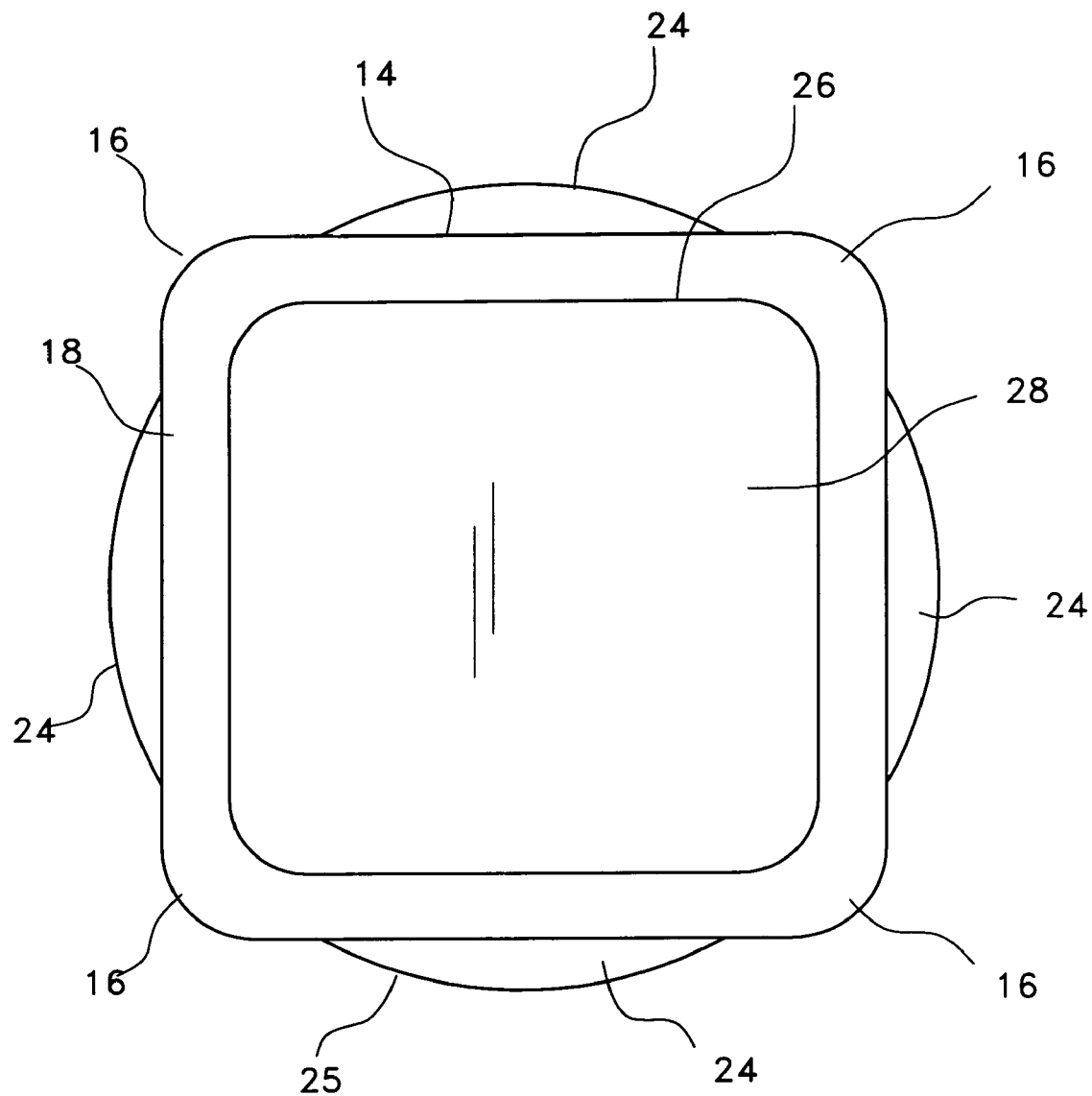
FIG. 4 is a bottom view of the anchor/adaptor of FIG. 1.

Referring to the Figures, anchor adaptor 10 has an elongate, vertically disposed tubular body 12 having a substantially square sidewall 14 with radius-curved corners 16 and having a lower open end portion 18 and an upper open end portion 20. A horizontally disposed plug wall 28 separates the tubular body 12 into female upper portion 21 having an upper inner wall 22 for receiving a post 30 (see FIG. 2) and a female lower portion 23 having a lower inner wall 26 for receiving an anchor extension tube 34 (see FIG. 5). The body female upper portion 21 has crescents 24 extending outward from the surfaces of the square upper open end portion 20 forming an upper lip 25 at the entrance for post 30.

Figure 5:
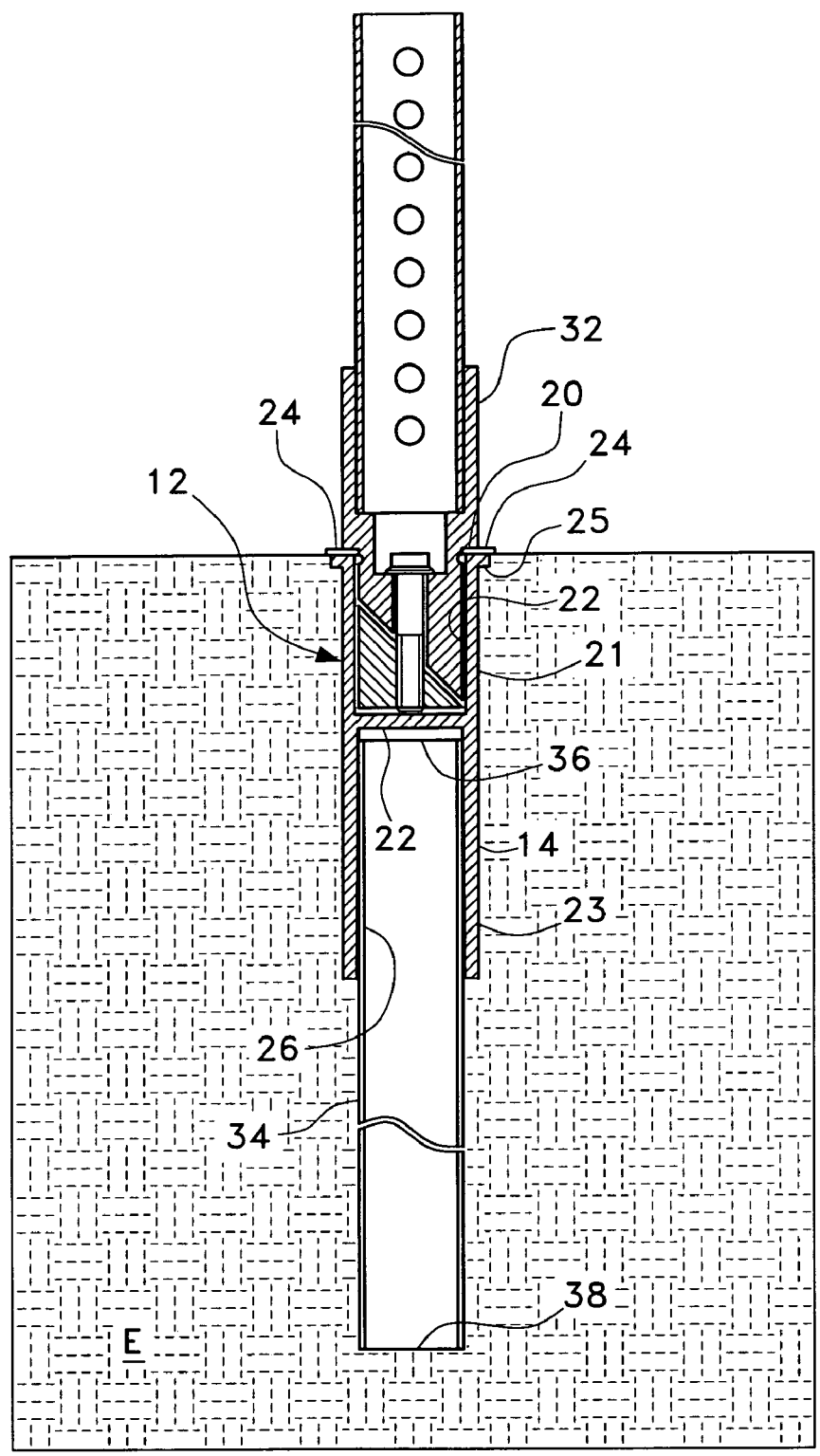
FIG. 5 is an environmental sectional view of the anchor/adaptor of FIG. 1 with an anchor extender.
Figure 6:
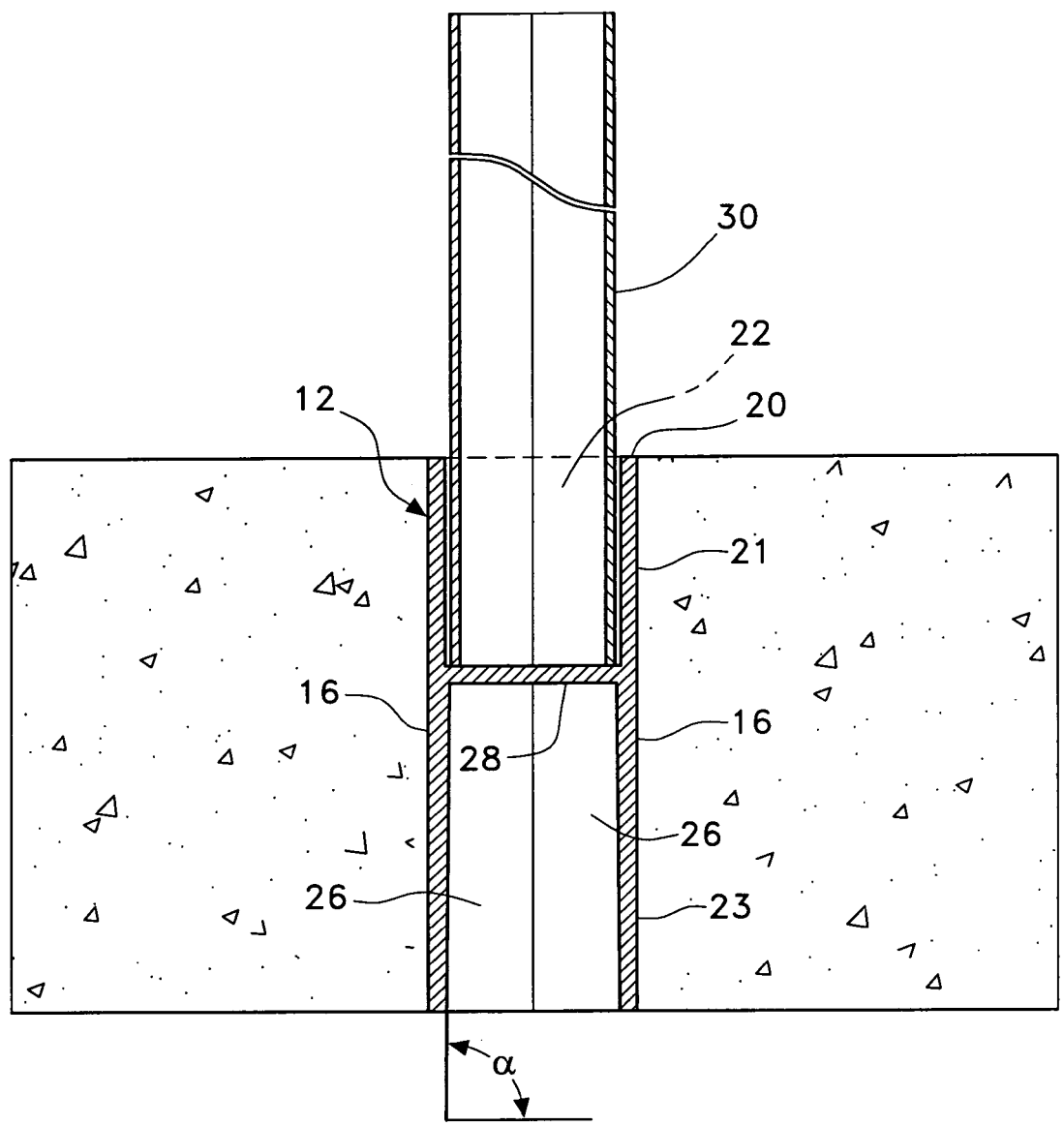
FIG. 6 is an environmental sectional view of the post anchor/adaptor taken along the line 6-6 of FIG. 1.

Referring to FIGS. 5 and 6, the inner wall 26 of female lower portion 23 is tapered outward from the plug wall 28 to the body lower open end 18 so as to form an angle ∀ of about 89°. This allows for a tight fit for anchor extension tube 34 within body female lower portion 23 when anchor/adaptor 10 is used as an adaptor for anchor extension tube 34 for anchoring in earth and the like. This is done to account for tolerances in the dimensions of the anchor adaptor 10 and the anchor extension tube 34. The anchor extension tube 34 is press fit into body female lower portion 23 by tapping the anchor/adaptor 10 and the anchor extension tube 34 together before installation. The anchor/adaptor allows driving an anchor extension tube 34 of lighter weight material since the impact of the driver is taken by the anchor/extension 10 and the driving force transferred evenly to the extension tube 34. As shown in FIG. 5, anchor extension tube 34 has an upper end 36 and a lower end 38 and upper end 36 fits within the tapered lower inner wall 26 at a point spaced below plug wall 28, depending upon the actual dimensions of the anchor adaptor 10 and the anchor extension tube 34. A knockoff post 32 is shown anchored in anchor adaptor 10.

The horizontal plug wall 28 prevents soil, gravel or asphalt from coming up into the anchor/adaptor 10 during driving when used as an anchor. This eliminates the need for cleaning out the hard, compacted foreign material from the top of the anchor prior to inserting the post. Further, by having the telescoping portion of the anchor/adaptor plugged, the post cannot fall or be inserted too far, and there is no need to hold the post in place while fasteners are installed.

Figure 7:
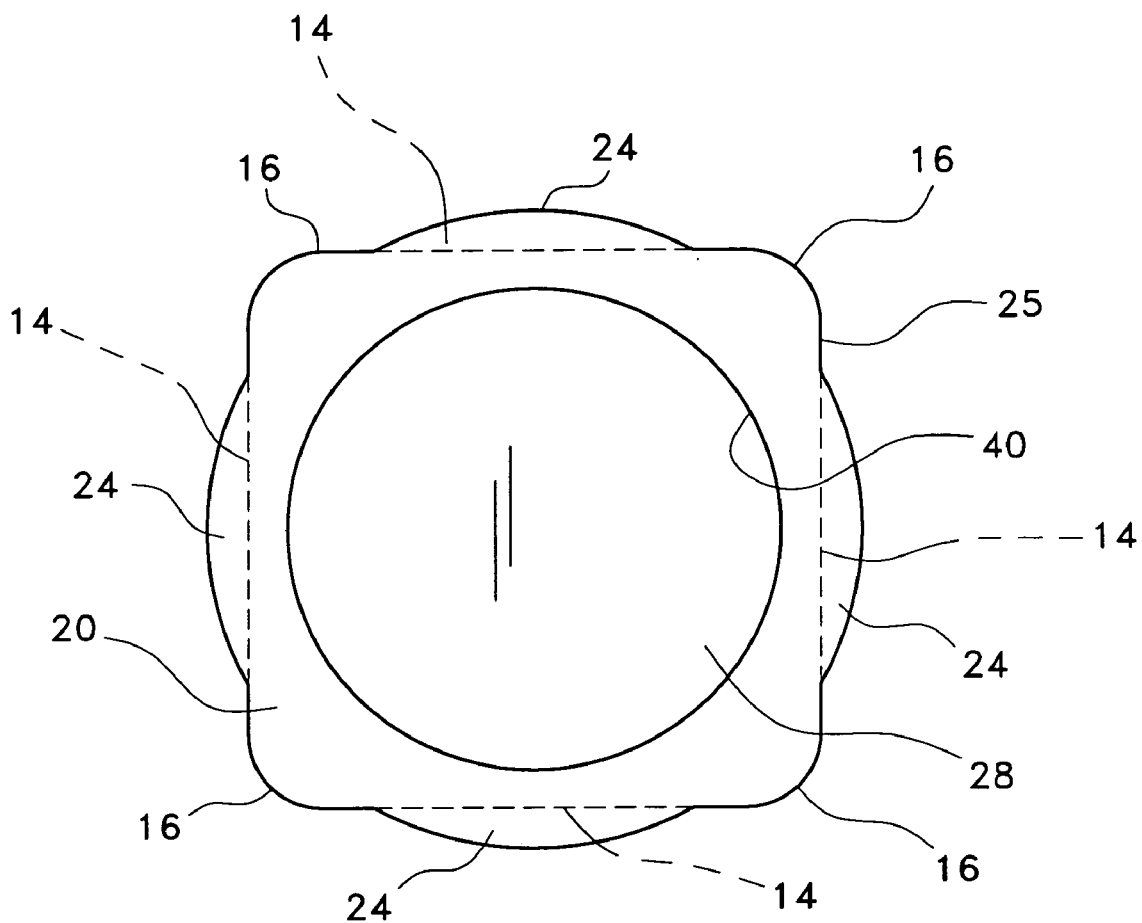
FIG. 7 is a plan view of an anchor/adaptor of FIG. 1 for a round post.
Figure 8:
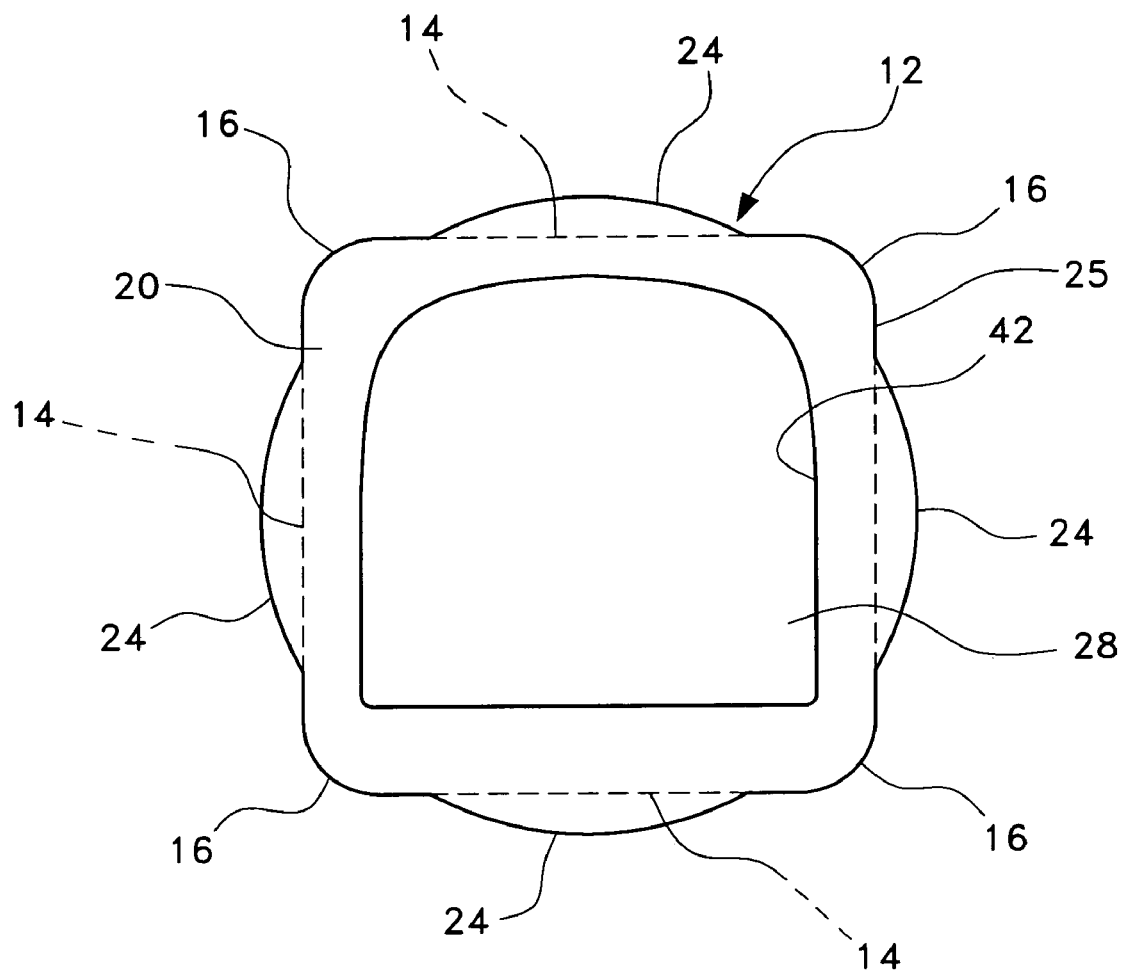
FIG. 8 is a plan view similar to that of FIG. 7 for a "U"-shaped post.

Referring to FIGS. 7 and 8, there are shown plan views of an anchor adaptor according to the present invention having an upper cylindrical inner wall 40 and an upper "U"-shape inner wall 42, respectively, the remaining features being as described in the discussion above of the anchor adaptor of FIGS. 1-6 having a square-shape inner wall.

Figure 9:
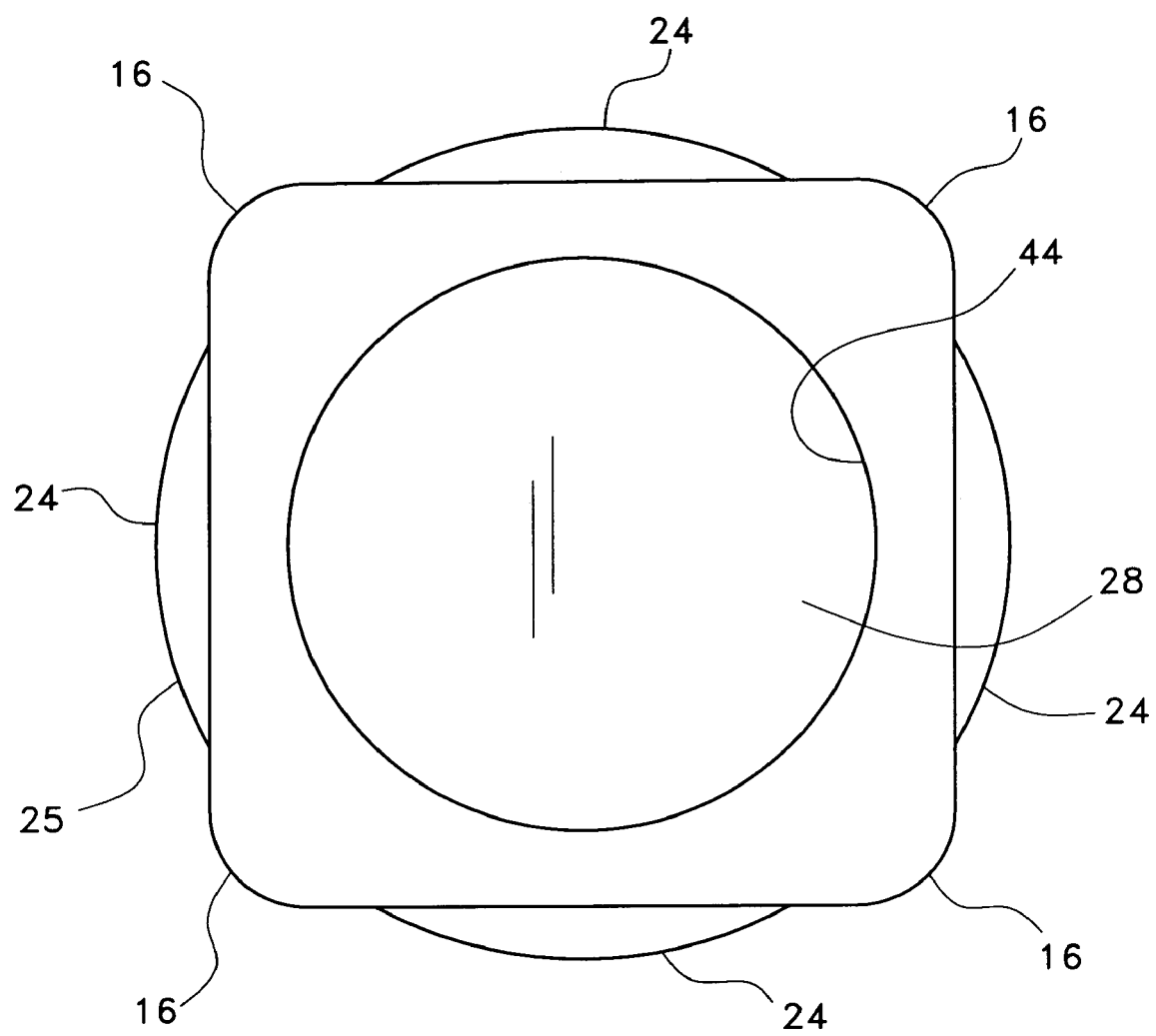
FIG. 9 is a bottom view of the anchor/adaptor of FIG. 1 for a round anchor extender.

Referring to FIG. 9, there is shown a bottom view of an anchor adaptor according to the present invention having a cylindrical inner wall 44 (slightly tapered as above), the remaining features being as described in the discussion above of the anchor adaptor of FIGS. 1-8.

The anchor/adaptor 10 is unitary and may be made of cast or machined steel, ferrous alloys, aluminum, or other appropriate material. Although not limited to any particular configuration or dimensions, an example of the anchor/adaptor 10 has an overall height of 1.51", a female upper portion wall of 3.5" in height with an inner width of 2.050", a female lower portion wall of 4.750" with a tapered, downward opening wall at 89 degrees relative to vertical having an upper inner width of 1.950" and a lower inner width of 2.069", an upper lip of 0.250" thickness at the upper opening and having an overall width of 2.9" with a diagonal overall width of 3.225" (also the diagonal of the square body).

The corners of the square tubular body have a radial length of 0.375" and the crescents have a radial length of 0.375", each spanning 61 degrees. The anchor extension may be of any gauge thickness and length appropriate for a particular application. The anchor extension can be made from lighter material than the top portion of the anchor/adaptor which facilitates its driving as its mass is lower than a conventional heavy wall anchor.

Although not shown in the drawings, the upper portion of the post anchor/adapter may have one or more holes through the wall for bolting or riveting metal posts or the like having corresponding mounting holes. This is a well-known practice in fastening posts to post anchors.

It is to be understood that the present invention is not limited to the embodiments described above, but encompasses any and all embodiments within the scope of the following claims.

I claim:

1. A post anchor/adapter, comprising:
   a vertically disposed elongate tubular body of unitary construction having four sidewalls and a square cross section, the corners of said square tubular body form spaced radius curved corners;
   a horizontally disposed plug wall permanently attached within said square tubular body dividing said square tubular body into an upper portion and a lower portion;
   said upper portion having an upper open end;
   said upper portion having an upper inner wall extending between said upward open end and said plug wall for receiving a post;
   said upper portion being further defined by having four spaced crescent-shaped tabs extending outward from the four sidewalls of said square tubular member body and forming an outward extending lip at said upper open end, said spaced crescent-shaped tabs forming a disk for covering a round post-receiving hole;

whereby, upon driving said square tubular body into the round post-receiving hole in cement or other hard ground material, said corners engage with and cut creases within the post-receiving hole, anchoring said anchor/adaptor within the hole.

2. The post anchor/adapter of claim 1, wherein said elongate tubular body lower portion has a lower open end, and a lower inner wall extending between said lower open end and said plug wall for receiving an anchor extension tube for driving into earth or like ground material.

3. The post anchor/adapter of claim 1, wherein said upper inner wall forms a generally square cavity for receiving a square post.

4. The post anchor/adapter of claim 1, wherein said upper inner wall forms a cylindrical cavity for receiving a cylindrical post.

5. The post anchor/adapter of claim 1, wherein said upper inner wall forms a "U"-shaped cavity for receiving a "U"-shaped post.

6. The post anchor/adapter of claim 1, wherein said lower inner wall forms a generally square cavity for receiving a square anchor extension tube.

7. The post anchor/adapter of claim 6, wherein said lower inner wall is tapered outward from about said plug wall to said lower open end for press-fit engaging the anchor extension tube.

8. The post/adapter of claim 1, wherein said lower inner wall forms a generally cylindrical cavity for receiving a cylindrical anchor extension tube, and wherein said lower inner wall is tapered outward from about said plug wall to said lower open end for press-fit engaging the anchor extension tube.

* * * * *